Patented Apr. 21, 1931

1,802,208

UNITED STATES PATENT OFFICE

ERWIN HOFFA AND MAX KERTH, OF FRANKFORT-ON-MAIN-HOCHST, GERMANY, ASSIGNORS TO GENERAL ANILINE WORKS, INC., OF NEW YORK, N. Y., A CORPORATION OF DELAWARE

PROCESS OF PRODUCING DYEINGS AND PRINTS

No Drawing. Application filed October 17, 1928, Serial No. 313,184, and in Germany October 20, 1927.

The present invention relates to the production of dyeings and prints.

We have found that dyeings and prints of excellent properties as to fastness can be produced on vegetable fiber, by first treating the fiber with an arylthioglycol-ortho-carboxylic acid-amide of the general formula

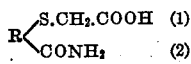

wherein R stands for an aromatic residue which may be substituted or not, in the presence of an alkali, then, if desired drying the material and subsequently steaming and subjecting it to an oxidation process. The treatment of the vegetable fiber with the said product in the presence of an alkali can be carried out by padding or applying on the vegetable fiber a printing paste containing the said body and an alkali.

The following examples serve to illustrate our invention, but they are not intended to limit it thereto:

(1) Cotton material is printed upon with a printing paste composed as follows:

50 grams of 5-chloro-1-methylbenzene-3-thioglycolic acid-2-carboxylic acid amide are dissolved in
150 grams of hot water and
100 grams of caustic soda solution of 22° Bé. The solution is thickened with
500 grams of alkaline thickening paste B and
200 grams of British gum 1:1
—
1 kilo.

Alkaline thickening paste B

This is prepared by means of 100 grams of British gum
900 grams of caustic soda solution of 40° Bé.

1 kilo, the whole being boiled for ¼ hour and then cooled, while stirring.

After printing and drying the material is steamed for 3 minutes in a so called "Rapid steam-ager" at 102–103° C. and then developed in the oxidation bath, for instance by passing the material for 15–60 seconds through a solution heated to 50° C. of 30 grams of potassium ferricyanide per 1 liter of water.

For the developing operation there may also be used another oxidizing agent. For instance, the development to dyestuff may also be effected by treating the printed material with a solution of chloride of lime of ¼–½° Bé. and subsequently drying it on a drying cylinder. By the said developing operations the dyestuff is fixed so as to become fast.

After the material has undergone these treatments, it is rinsed, acidified in a solution of 10 ccm. of hydrochloric acid of 22° Bé. per liter of water, then again rinsed and soaped in a hot bath.

The dyeing has a bluish red tint of excellent properties as to fastness.

(2) Bleached cotton material is slop-padded with a padding liquor prepared as follows:

50 grams of 5-chloro-1-methylbenzene-3-thioglycolic acid-2-carboxylic acid amide are dissolved in
100 grams of hot water and
50 grams of caustic soda solution of 22° Bé. The solution is made up with a mixture of
200 grams of caustic soda solution of 40° Bé. and
600 grams of cold water, to
—
1 liter.

The whole is then dried, steamed for 3–5 minutes in the "Rapid steam-ager" at 102° C. to 103° C. and developed as indicated in Example 1.

If it is intended to produce white or colored resists, the material, after being impregnated with the padding liquor and dried, is printed for instance with the following pastes:

White resist

For the preparation of this resist are used:

400 grams of wheat starch-tragacanth thickening
30 grams of neutral ammonium oxalate,
370 grams of water,
100 grams of sodium sulfoxylate-formaldehyde 1:1
100 grams of kaoline in paste 1:1
—
1 kilo.

Colored resist

For the preparation of this resist are used:

150 grams of Caledon jade green (SDC), (Color index No. 1101.)
30 grams of solution salt B
350 grams of wheat starch-tragacanth
120 grams of potash
20 grams of water
30 grams of sodium bicarbonate
100 grams of kaolin 1:1
200 grams of sodium sulfoxylate-formaldehyde 1:1
—
1 kilo.

After the resists have been printed upon the material, it is dried, steamed and treated further as above described.

The dyeing thus produced shows a bluish-red tint of excellent properties as to fastness.

(3) Bleached cotton material is printed upon with a printing paste prepared as follows:

50 grams of 5-ethoxy benzene-3-thio glycolic acid-2-carboxylic acid amide are dissolved in
80 grams of ethylglycol
70 grams of hot water and
100 grams of caustic soda solution of 22° Bé. This solution is thickened with
700 grams of alkaline thickening paste B.
———
1 kilo.

After the material has been printed, it is further treated in the same manner as indicated in Example (1).

We claim:

1. The process of producing fast dyeings and prints on vegetable fiber, which consists in applying on the fiber an arylthioglycol-ortho-carboxylic acid amide of the general formula:

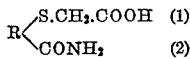

wherein R represents an aryl group which may be substituted or not, while using an alkali, then steaming and oxidizing the material.

2. The process of producing fast dyeings and prints on vegetable fiber, which consists in applying on the fiber an arylthioglycol-ortho-carboxylic acid amide of the general formula:

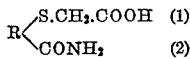

wherein R represents an aryl group which may be substituted or not, while using a caustic soda solution, then drying and steaming the material and oxidizing it by means of a solution of potassium ferricyanide.

3. The process of producing fast dyeings and prints on vegetable fiber, which consists in applying on the fiber an arylthioglycol-ortho-carboxylic acid amide of the following formula:

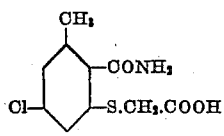

while using an alkali then, steaming and oxidizing the material.

4. The process of producing fast dyeings and prints on vegetable fiber, which consists in applying on the fiber an arylthioglycol-ortho-carboxylic acid amide of the following formula:

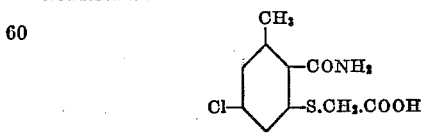

while using a caustic soda solution, then drying and steaming the material and oxidizing it by means of a solution of potassium ferricyanide.

In testimony whereof, we affix our signatures.

ERWIN HOFFA.
MAX KERTH.